US009495173B2

(12) United States Patent
Bar-Or et al.

(10) Patent No.: US 9,495,173 B2
(45) Date of Patent: Nov. 15, 2016

(54) SYSTEMS AND METHODS FOR MANAGING DATA IN A DEVICE FOR HIBERNATION STATES

(75) Inventors: Shahar Bar-Or, Raanana (IL); Eran Sharon, Rishon Lezion (IL); Idan Alrod, Herzliya (IL)

(73) Assignee: SanDisk Technologies LLC, Plano, TX (US)

( * ) Notice: Subject to any disclaimer, the term of this patent is extended or adjusted under 35 U.S.C. 154(b) by 30 days.

(21) Appl. No.: 13/330,185

(22) Filed: Dec. 19, 2011

(65) Prior Publication Data
US 2013/0159599 A1 Jun. 20, 2013

(51) Int. Cl.
*G06F 12/00* (2006.01)
*G06F 9/44* (2006.01)

(52) U.S. Cl.
CPC .................................. *G06F 9/4418* (2013.01)

(58) Field of Classification Search
CPC .... G06F 12/00; G06F 12/08; G06F 12/0246; G06F 12/0238; G06F 11/1312; G06F 11/3466; G06F 11/181; G06F 11/302; G06F 17/2247; G06F 17/30
See application file for complete search history.

(56) References Cited

U.S. PATENT DOCUMENTS

| 6,647,472 | B2 * | 11/2003 | Atkinson et al. ............. 711/158 |
| 8,181,046 | B2 * | 5/2012 | Marcu et al. ................. 713/320 |
| 8,438,250 | B2 * | 5/2013 | Ewing ............................ 709/220 |
| 2002/0078338 | A1 | 6/2002 | Lay et al. |
| 2002/0087816 | A1 | 7/2002 | Atkinson et al. |
| 2008/0178059 | A1 * | 7/2008 | Jen ................................ 714/757 |
| 2010/0082962 | A1 | 4/2010 | Srinivasan et al. |
| 2010/0106886 | A1 * | 4/2010 | Marcu ................... G06F 1/3225 711/102 |
| 2010/0281208 | A1 * | 11/2010 | Yang .............................. 711/103 |
| 2010/0318719 | A1 * | 12/2010 | Keays et al. ................... 711/103 |
| 2012/0096256 | A1 * | 4/2012 | Kim et al. ......................... 713/2 |
| 2012/0131320 | A1 * | 5/2012 | Park et al. ......................... 713/2 |

FOREIGN PATENT DOCUMENTS

| CN | 101211214 | 7/2008 |
| CN | 101246389 | 8/2008 |
| CN | 101356501 | 1/2009 |
| CN | 101743532 | 6/2010 |

(Continued)

OTHER PUBLICATIONS

International Search Report and Written Opinion for PCT/US2012/070004, mailed May 2, 2013, 8 pages.

(Continued)

*Primary Examiner* — Yong Choe
*Assistant Examiner* — Mohamed Gebril
(74) *Attorney, Agent, or Firm* — Brinks Gilson & Lione (57) ABSTRACT

The present application is directed to systems and methods for managing data in a device for hibernation states. In one implementation, the device includes an interface and a processor. The interface is coupled with a first memory and a second memory. The processor is in communication with the first and second memories via the interface. The processor is configured to read first data from the first memory, generate image data of the data stored in the first memory based on the first data, and write to the second memory prior to the device entering an initial hibernation state the image data of the data stored in the first memory. The processor is further configured to, after the device awakes from the initial hibernation state, read the image data from the second memory, reconstruct the first data based on the image data, and write the first data to the first memory.

10 Claims, 4 Drawing Sheets

(56) References Cited

FOREIGN PATENT DOCUMENTS

| | | |
|---|---|---|
| EP | 0 365 128 A2 | 9/1989 |
| WO | 2007/056436 A1 | 5/2007 |
| WO | 2009/009719 A2 | 1/2009 |
| WO | 2010/129159 A2 | 11/2010 |

OTHER PUBLICATIONS

International Preliminary Report on Patentability issued in PCT Application No. PCT/US2012/070004, dated Jun. 24, 2014, 6 pgs.
First Office Action issued in corresponding CN Application No. 201280069740.X on Aug. 22, 2016, 20 pages.

* cited by examiner

SYSTEMS AND METHODS FOR MANAGING DATA IN A DEVICE FOR HIBERNATION STATES

BACKGROUND

It is desirable for devices, such as mobile devices, to have the ability to both quickly resume operations from a hibernation state (also known as an idle mode) and to store data for extended periods of time in a hibernation state while consuming small amounts of power. In order to provide the ability for a device to awake quickly from a hibernation state, many devices utilize DRAM memory. DRAM memory provides the ability to quickly perform operations such as read and write operations when awaking from a hibernation state. However, DRAM is a volatile memory that consumes power to maintain data, and therefore, consumes power while a device is in a hibernation state.

Other devices utilize NAND memory. NAND memory provides the ability to store data for extended periods of time during a hibernation state while consuming small amounts of power. However, NAND memory is slower than DRAM memory with respect to operations such as write and read operations.

Improved storage devices are desirable for use in devices such as mobile devices that are able to provide the speed of memory such as with DRAM memory, while providing the ability to store data for extended periods of time while consuming small amounts of power such as with NAND memory.

SUMMARY

The present disclosure is directed to systems and methods for managing data in a device for hibernation. In one aspect, a method for managing data storage in conjunction with hibernation of a device is disclosed. A controller of a device reads data from a first memory of the device and generates image data of the data stored in the first memory based on the first data. The controller writes to a second memory prior to entering an initial hibernation state the image data of the data stored in the first memory. After waking from the initial hibernation state, the controller reads the image data from the second memory, reconstructs the first data based on the image data, and writes the first data to the first memory.

In another aspect, a device is disclosed. The device includes an interface and a processor. The interface is coupled with a first memory and a second memory. The processor is in communication with the first and second memories via the interface. The processor is configured to read first data from the first memory and generate image data of the data stored in the first memory based on the first data. The processor is further configured to write to the second memory prior to the device entering an initial hibernation state the image data stored in the first memory. The processor is further configured to, after the device awakes from the initial hibernation state, read the image data from the second memory, reconstruct the first data based on the image data, and write the first data to the first memory.

DETAILED DESCRIPTION OF THE DRAWINGS

The present disclosure is directed to systems and methods for managing data in a device for hibernation states. As discussed in more detail below, a device may include two types of memory. A first memory of the device, such as DRAM memory, may have properties such as fast write and read times. A second memory of the device, such as NAND memory, may have properties such as being able to store data for extended periods of time while consuming small amounts of power. In order to utilize the advantages of the two types of memory, a controller of the device may perform operations to utilize the first memory while the device is awake and utilize the second memory while the device is in a hibernation state. Switching data between the first and second memories allows the device to quickly perform operations while awake and to store data for extended periods of time with small power consumption while the device is in a hibernation state.

Figure 1:
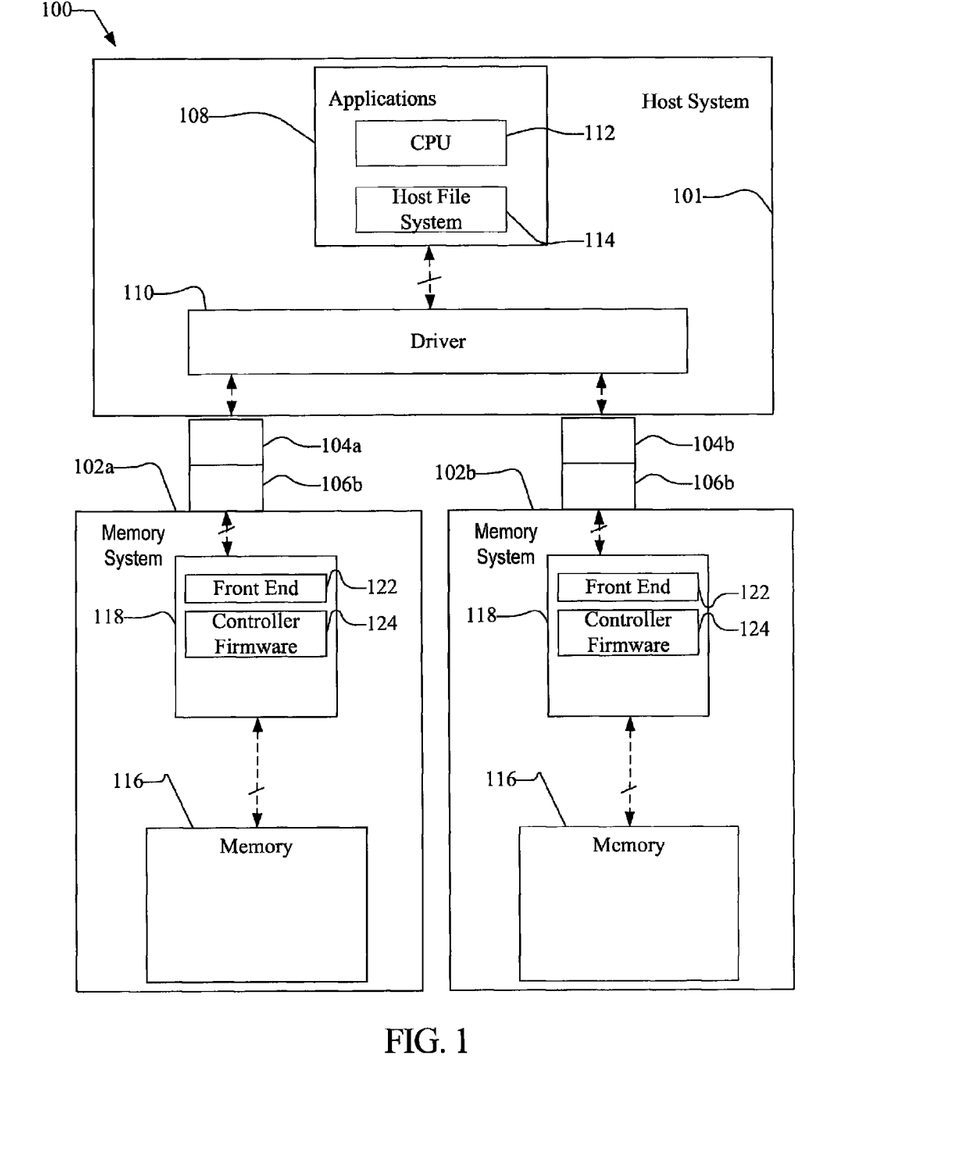
FIG. 1 is a block diagram of one implementation of a device suitable for managing data for hibernation states.

A device 100 suitable for use in implementing aspects of the invention is shown in FIG. 1. A host system 101 stores data into and retrieves data from a first memory system 102a and/or a second memory system 102b. The first and/or second memory systems 102a, 102b may be memory embedded within the device, such as in the form of a solid state disk (SSD) drive installed in a personal computer. Alternatively, the first and/or second memory systems 102a, 102b may be in the form of a card that is removably connected to the host through mating parts 104a and 106a, or 104b and 106b, of a mechanical and electrical connector as illustrated in FIG. 1. A memory configured for use as an internal or embedded SSD drive may look similar to the schematic of FIG. 1, with the primary difference being the location of the first and/or second memory systems 102a, 102b internal to the host. SSD drives may be in the form of discrete modules that are drop-in replacements for rotating magnetic disk drives.

The host system 101 of FIG. 1 may be viewed as having two major parts, in so far as the memory systems 102a, 102b are concerned, made up of a combination of circuitry and software. They are an applications portion 108 (a controller) and a driver portion 110 that interfaces with the memory systems 102a, 102b. In a PC, for example, the applications portion 108 can include a processor 112 running word processing, graphics, control or other popular application software, as well as the file system 114 for managing data on the host 101. In a camera, cellular telephone or other host system that is primarily dedicated to perform a single set of functions, the applications portion 108 includes the software that operates the camera to take and store pictures, the cellular telephone to make and receive calls, and the like.

The memory systems 102a, 102b of FIG. 1 include memory 116 and a system controller 118 that both interfaces with the host 101 to which the memory system is connected for passing data back and forth and controls the memory 116. The system controller 118 may convert between logical addresses of data used by the host 101 and physical addresses of the memory 116 during data programming and reading. Functionally, the system controller 118 may include a front end 122 that interfaces with the host system and controller logic 124 for coordinating operation of the memory 116

In some implementations the first memory 102a is memory such as DRAM memory that is able to quickly perform operations such as write and read operations and the second memory 102b is NAND memory that is able to store data for extended periods of time while consuming small amounts of power. However, other memory configurations may also be used.

Because of the different properties of DRAM memory and NAND memory, the controller 108 of the host 101 may be configured to shift copies of data between the first and second memories 102a, 102b before and after entering a hibernation state. The controller 108 shifts copies of the data to utilize the DRAM memory while the device 100 is awake to provide fast read and write operations, and to utilize the NAND memory while the device 100 is in a hibernation state to provide the ability to store data for extended periods of time while consuming small amounts of power.

As explained in more detail below, the controller 108 generally stores in the second memory 102b an initial image of the data stored in the first memory 102a before the device 100 enters an initial hibernation state. When the device 100 awakes from the hibernation state, the controller 108 reads from the second memory 102b the initial image of the data, reconstructs data based on the initial image of data, and stores the reconstructed data in the first memory 102a.

Before entering a subsequent hibernation, the controller 108 checks the data currently stored in the first memory 102a against the initial image of the data of the first memory 102a that is stored in the second memory 102b. When the controller 108 determines the data stored in the first memory 102a has changed, before entering a subsequent hibernation state, the controller 108 stores a set of data (also known as a delta) in the second memory 102b that represents data stored in the first memory 102a that has changed since a previous hibernation state.

When the device 100 awakes from hibernation, the controller 108 reads the image of data and the delta from the second memory 102b, reconstructs data based on the image of data and the delta of data, and stores the reconstructed data in the first memory 102a. In some implementations, the controller 108 may repeat this process for subsequent hibernations until a condition occurs that causes the controller 108 to store in the second memory 102b a new initial image of the data stored in the first memory 102a. Examples of conditions that may cause the controller 108 to store a new initial image of the data stored in the first memory 102a may include a number of deltas stored in the second memory 102b exceeding a threshold and/or an amount of data stored in the first memory 102a that has changed since storing in the second memory 102b the initial image of data stored in the first memory 102a exceeding a threshold.

Figure 2:
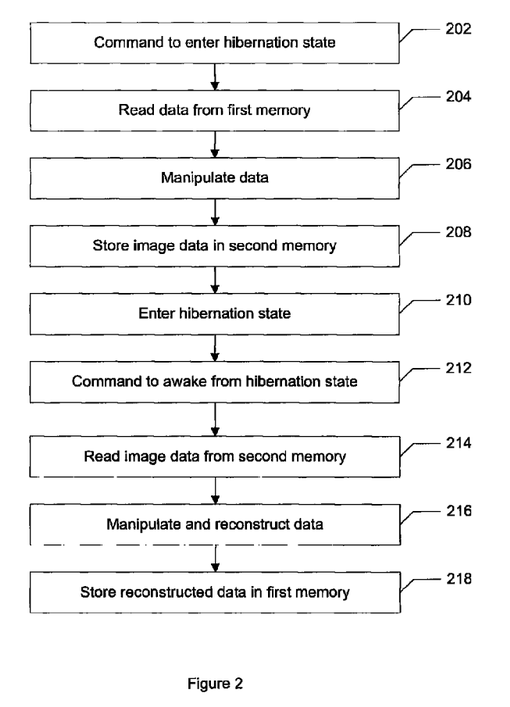
FIG. 2 is a flow chart of one implementation of a method for managing data within a device before and after the device enters an initial hibernation state.

FIG. 2 is a flow chart of one implementation of a method for managing data within a device before and after the device enters a hibernation state. The method begins at step 202 with a controller determining a need for the device to enter a hibernation state. It will be appreciated that the controller may determine the need for the device to enter a hibernation state based on a signal received from a user actuating a button on the device, an amount of time since a last operation by the device, and/or any other factor that may alert the controller to a need to enter a hibernation state.

At step 204, the controller reads data from the first memory and creates an initial image of the data stored in the first memory, which may be DRAM memory. At step 206, the controller may manipulate the image of the data stored in the first memory by performing operations such as compressing the data to reduce the size of the data or shaping the data to reduce wear on the memory. In some implementations, to shape the data, the controller may transform the bit sequence of the data to reduce a number of zeros making up the bit sequence so that an increased number of memory cells may remain in an erased state. Examples of algorithms that may be utilized to shape the data are described in U.S. Pat. No. 7,984,360, issued Jul. 19, 2011; U.S. Provisional Patent App. No. 61/549,448, filed Oct. 20, 2011; and U.S. Provisional Patent App. No. 61/550,694, filed Oct. 24, 2011, the entirety of each of which are hereby incorporated by reference.

At step 208, the controller stores in the second memory the initial image of the data stored in the first memory. As discussed above, in some implementations the second memory may be NAND memory. At step 210, the device enters an initial hibernation state.

At step 212, the controller determines a need to awake from the initial hibernation state. It will be appreciated that the controller may determine the need to awake from the initial hibernation state based on a signal received from a user actuating a button on the device, and/or any other factor that may alert the controller to a need to awake from the hibernation state. In response, at step 214, the controller reads from the second memory the initial image of data representing the data stored in the first memory prior to the storage device entering the hibernation state. At step 216, the controller manipulates the data to reverse any operations that may have been performed on the data at step 206 and reconstructs data based on the initial image of data. At step 218, the controller then stores in the first memory the reconstructed data to restore the contents of the first memory.

After storing the image data in the first memory, the device may perform normal operations where the controller writes data to, and reads data from, the first memory. These operations may continue until a controller determines a need to enter a subsequent hibernation state.

Figure 3:
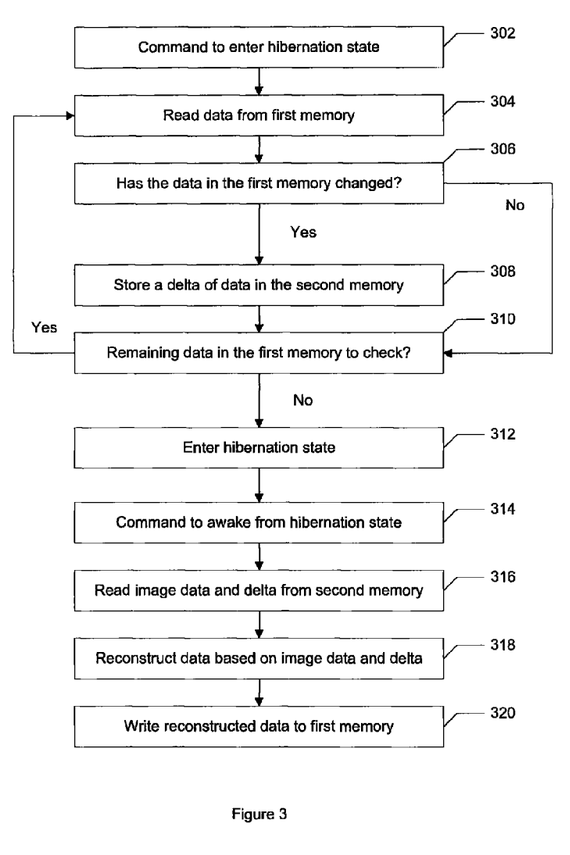
FIG. 3 is a flow chart of one implementation of a method for managing data within a device before and after the device enters a subsequent hibernation state.

FIG. 3 is a flow chart of one implementation of a method for managing data within a device before and after the device enters a subsequent hibernation state after performing the operations discussed above in conjunction with FIG. 2.

At step 302, the controller determines a need for the device to enter a subsequent hibernation state. At step 304, the controller reads data from the first memory. In some implementations, the controller reads all the data from the first memory. However, in other implementations, the controller only reads a portion of the data stored in the first memory, such as a sector of the first memory, a page of the first memory, a block of the first memory, or any other desired portion of the memory.

At step 306, the controller determines whether data read from the first memory at step 304 has changed since the device awoke from a previous hibernation state. In some implementations, the controller determines whether the data has changed by comparing the portion of data read from the first memory at step 304 to data reconstructed from the initial image of data stored in the second memory that represents the data stored in the first memory prior to the previous hibernation. It will be appreciated that depending on the portion of data read from the first memory at step 304, the controller may compare a corresponding portion of the image data stored in the second memory, such as the entire image of data of the first memory, a sector of the first memory, a page of the first memory, or a block of the first memory.

In some implementations, at step 306, the controller may determine whether data stored in the first memory has changed by calculating a cyclic redundancy check (CRC) for the portion of the data read from the first memory at step 304 and the related portion of data reconstructed based on the image of data stored in the second memory, and then determining whether the two values are equal. If the two CRC values are equal, the data stored in the portion of the data read from the first memory at step 304 has not changed. However, if the two CRC values are different, the portion of the data read from the first memory at step 304 has changed.

When the controller determines the data stored in the portion of data read from the first memory has changed, at step 308, the controller stores a set of data (also known as a delta) in the second memory representing the contents of the data read from the first memory at step 304 that has changed since the last previous hibernation. In some implementations, the controller may compress and/or shape the data representing the content of the data read from the first memory that has changed since the last previous hibernation before storing the data in the second memory.

After storing the delta in the second memory, the controller proceeds to determine at step 310 whether any remaining portions of data stored in the first memory need to be checked so that the controller may save in the second memory any changes to the data stored in the first memory that has changed since the previous hibernation state. If the controller determines that no remaining portions of the data stored in the first memory need to be checked, the device enters a hibernation state at step 312. However, if the controller determines that remaining portions of the data stored in the first memory need to be check, the method loops to step 304 and the above-described method is repeated until the controller determines that no remaining portions of the data stored in the first memory needs to be checked. The device then enters a hibernation state at step 312.

Referring again to step 306, when the controller determines that the contents of the data read from the first memory at step 304 has not changed, the method proceeds to step 310, where the controller proceeds as described above to determine whether any remaining portions of data stored in the first memory need to be checked so that the controller may save in the second memory any changes to the data stored in the first memory since the previous hibernation state.

At step 314, the controller determines a need to awake from the hibernation state. At step 316, the controller reads from the second memory the image data of the contents of the first memory and reads from the second memory any delta that the controller stored in the second memory. If the controller performed any manipulation of the data such as compressing and/or shaping the image data and/or the deltas, the manipulation of the data is reversed. At step 318, the controller reconstructs data based on the initial image data and the one or more deltas, and at step 320, the controller writes the reconstructed data to the first memory. It will be appreciated that after writing to the first memory the data reconstructed based on the image data and the deltas, the contents of the first memory will include any valid data present in the first memory before the storage device entered the previous hibernation state.

The method described above in conjunction with FIG. 3 may be repeated each time the storage device enters a subsequent hibernation state after storing in the second memory an initial image of the contents of the first memory as described above in conjunction with FIG. 2. In implementations where multiple deltas are stored in the second memory, the controller may store the initial image data of the first memory and each delta in different dies of the second memory in order to increase parallelism of the reading of the image data and the deltas when the storage device awakes from a hibernation state.

In some implementations, the controller may determine when to store in the second memory a new image of the contents of the first memory based on factors such as a number of deltas that are stored in the second memory and/or the amount of data that has changed in the contents of the first memory since storing in the second memory an initial image of the contents of the first memory.

Limiting the number of deltas or the amount of data that may change in the contents of the first memory before storing in the second memory a new image of the contents of the first memory prevents slow performance of the device when entering and/or exiting a hibernation states caused by the controller performing an unacceptable number of operations associated with storing deltas in the second memory and/or reading deltas from the second memory and reconstructing data based on the deltas.

The following example illustrates the number of operations that the controller may perform to reconstruct data when multiple deltas are saved in the second memory. When the controller saves one or more deltas during different hibernations states, in some implementations, a delta may represent a change in data in the first memory from a previous hibernation state. For example, a controller may store an initial image of data of the first memory before an initial hibernation state, store a first delta of data before a first subsequent hibernation state, store a second delta of data before a second subsequent hibernation state, and store a third delta of data before a third subsequent hibernation state. The first delta represents a change in the data of the first memory from the initial hibernation state, the second delta represents a change in the data of the first memory from the first subsequent hibernation state, and the third delta represents a change in the data of the first memory from the second subsequent hibernation state.

Accordingly, in order to reconstruct the data in the first memory before the third subsequent hibernation state, the controller will apply the first delta of data to the initial image of data to reconstruct the contents of the first memory before the first subsequent hibernation state; apply the second delta of data to the reconstructed contents of the first memory before the first subsequent hibernation state to reconstruct the contents of the first memory before the second subsequent hibernation state; and finally, apply the third delta of data to the reconstructed contents of the first memory before the second subsequent hibernation state to reconstruct the contents of the first memory before the third subsequent hibernation state.

Figure 4:
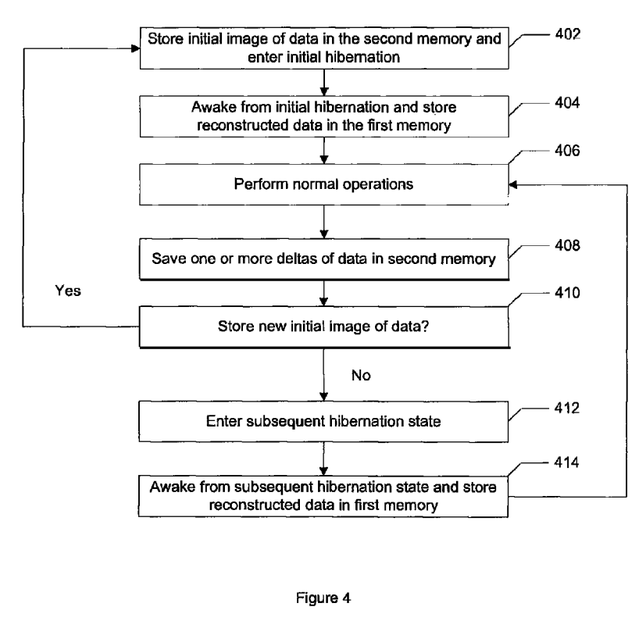
FIG. 4 is a flow chart of one implementation of a method for a controller to determine when to store in a second memory a new initial image of data stored in a first memory.

FIG. 4 illustrates one method for a controller determining when to store in the second memory a new image of the data stored in the first memory in order to prevent slow performance of the storage device. The method begins at step 402 with the controller storing in the second memory an initial image of the contents of the data stored in the first memory as the device enters an initial hibernation state as described above. At step 404, as the device awakes from the initial hibernation, the controller reads the initial image data from the second memory and stores in the first memory data reconstructed based on the image data as described above.

At step 406, the controller performs normal operations reading data from the first memory and writing data to the first memory.

At step 408, the controller prepares to enter a subsequent hibernation state as described above in conjunction with FIG. 3 where the controller saves one or more deltas in the second memory representing data stored in the first memory that has changed since the previous hibernation state. However, prior to entering the subsequent hibernation state, the controller determines at step 410 whether to store in the second memory a new image of the data stored in the first memory. In some implementations, the controller may determine whether to store in the second memory a new image of the data based on factors such as whether a number of deltas saved in the second memory since storing in the second memory the initial image data exceeds a threshold, whether an amount of data in the first memory that has changed since storing in the second memory the initial image data exceeds a threshold, and/or any other desired factor that indicates to the controller that in order to preserve the performance of the device, the controller should store in the second memory a new image of the data stored in the first memory.

When at step 410, the controller determines not to store in the second memory new image data of the contents of the first memory, the device proceeds to enter a subsequent hibernation state at 412. At step 414, as the device awakes from the subsequent hibernation state, the controller reads the initial image data and any deltas stored in the second memory as described above, reconstructs data based on the initial image data and any deltas, and stores the reconstructed data in the first memory. The method then loops to step 406, where the controller performs normal operations reading data from the first memory and writing data to the first memory in conjunctions with instructions received from the host.

However, when at step 410, the controller determines a need to store new image data of the contents of the first memory, the method loops to step 402 where the controller stores in the second memory a new initial image of the contents of the data stored in the first memory as the device enters a new initial hibernation state and the method described above is repeated.

In some implementations, the controller may perform operations in addition to those described above in order to increase the speed at which the device is able to wake from a hibernation state. For example, as the device awakes from a hibernation state, the controller may initially only write those portions of data into the first memory that are responsible for basic functionality or functionality that a host and/or user may immediately need access to upon the device waking from the hibernation state. The controller may then subsequently load the remainder of the data into the first memory while the device receives commands from the host and/or user.

FIGS. 1-4 describe systems and methods for managing data in a device for hibernation states. As discussed above, a device may include two types of memory having different properties. In some implementations, a first memory, such as DRAM memory, may have properties such as fast write and read times, where a second memory, such as NAND memory, may have properties such as being able to store data for extended periods of time while consuming small amounts of power. In order to utilize the advantages of the two types of memory, a controller of the device may perform operations to utilize the first memory while the device is awake and utilize the second memory while the device is in a hibernation state. Switching data between the first and second memories allows the device to quickly perform operations while awake and to store data for extended periods of time with small power consumption while the data storage device is in a hibernation state.

It is intended that the foregoing detailed description be regarded as illustrative rather than limiting, and that it be understood that it is the following claims, including all equivalents, that are intended to define the spirit and scope of this invention.

The invention claimed is:

1. In a controller of a device operatively coupled with a first memory and a second memory, a method for managing data storage in conjunction with hibernation of the device, the method comprising:
  reading first data from the first memory and generating image data of data stored in the first memory based on the first data; and
  writing to the second memory prior to the device entering an initial hibernation state the image data of data stored in the first memory;
  after waking from the initial hibernation state:
    reading the image data from the second memory and reconstructing the first data based on the image data;
    writing the reconstructed first data to the first memory;
    reading second data from the first memory; and
    comparing the second data to at least a portion of data reconstructed from the image data stored on the second memory to determine whether data stored in the first memory has changed since the device awoke from the initial hibernation state;
  in response to determining that data stored in the first memory has changed since waking from the initial hibernation state:
    storing in the second memory a first delta of data representing at least a portion of the data stored in the first memory that has changed since the device awoke from the initial hibernation state, the first delta of data being stored in the second memory prior to the device entering a first subsequent hibernation state;
  after waking from the first subsequent hibernation state:
    reading the image data and the first delta of data from the second memory and reconstructing the second data based on the image data and the first delta of data;
    writing the reconstructed second data to the first memory;
    determining that data stored in the first memory has changed since waking from the initial hibernation state, and in response:
      determining that a number of deltas of data stored in the second memory exceeds a threshold, and in response:
        generating new image data of the data stored in the first memory; and
        writing to the second memory prior to entering a next hibernation state the new image data of the data stored in the first memory.

2. The method of claim 1, wherein the first memory comprises DRAM memory and the second memory comprises NAND memory.

3. The method of claim 1, further comprising:
  compressing the first delta of data to reduce the size of the first delta of data prior to storing the first delta of data in the second memory.

4. The method of claim 1, further comprising:
shaping the first delta of data to reduce a number of zeros in a bit stream of the first delta of data prior to storing the first delta of data in the second memory.

5. The method of claim 1, wherein comparing the second data to at least a portion of the image data stored on the second memory to determine whether data stored in the first memory has changed since the device awoke from the initial hibernation state comprises:
calculating a first cyclic redundancy check (CRC) for the second data;
calculating a second CRC for the data reconstructed from the image data stored on the second memory; and
determining whether the first CRC and the second CRC are equal.

6. The method of claim 1, wherein the second data and the portion of data are a sector of memory.

7. The method of claim 1, wherein the second data and the portion of data are a page of memory.

8. The method of claim 1, wherein the second data and the portion of data are a block of memory.

9. A device comprising:
an interface coupled to a first memory and a second memory;
a processor for managing data storage in conjunction with hibernation of the device, the processor in communication with the first and second memory via the interface and configured to:
read first data from the first memory;
generate image data of data stored in the first memory based on the first data; and
write to the second memory prior to the device entering an initial hibernation state the image data of data stored in the first memory; and
after the device awakes from the initial hibernation state:
read the image data from the second memory and reconstruct the first data based on the image data;
write the reconstructed first data to the first memory;
read second data from the first memory;
compare the second data to at least a portion of data reconstructed from the image data stored on the second memory to determine whether data stored in the first memory has changed since the device awoke from the initial hibernation state;
in response to determining that data stored in the first memory has changed since waking from the initial hibernation state, store in the second memory a first delta of data representing at least a portion of the data stored in the first memory that has changed since the device awoke from the initial hibernation state, the first delta of data being stored in the second memory prior to the device entering a first subsequent hibernation state;
after waking from the first subsequent hibernation state:
read the image data and the first delta of data from the second memory and reconstruct the second data based on the image data and the first delta of data;
write the reconstructed second data to the first memory;
determine that data stored in the first memory has changed since waking from the initial hibernation state, and in response:
determine that a number of deltas of data stored in the second memory exceeds a threshold, and in response:
generate new image data of the data stored in the first memory; and
write to the second memory prior to entering a next hibernation state the new image data of the data stored in the first memory.

10. The device of claim 9, wherein the first memory comprises DRAM memory and the second memory comprises NAND memory.

* * * * *